(12) United States Patent
Hosoki

(10) Patent No.: US 8,576,355 B2
(45) Date of Patent: Nov. 5, 2013

(54) LED SUBSTRATE, BACKLIGHT UNIT, AND LIQUID CRYSTAL DISPLAY DEVICE

(75) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 13/520,488

(22) PCT Filed: Nov. 18, 2010

(86) PCT No.: PCT/JP2010/070619
§ 371 (c)(1),
(2), (4) Date: Jul. 3, 2012

(87) PCT Pub. No.: WO2011/083634
PCT Pub. Date: Jul. 14, 2011

(65) Prior Publication Data
US 2013/0002985 A1 Jan. 3, 2013

(30) Foreign Application Priority Data
Jan. 7, 2010 (JP) ................................ 2010-001885

(51) Int. Cl.
*G02F 1/1335* (2006.01)
*F21V 7/04* (2006.01)

(52) U.S. Cl.
USPC .......................................... 349/69; 362/612

(58) Field of Classification Search
USPC .......................................... 349/69; 362/612
See application file for complete search history.

(56) References Cited

U.S. PATENT DOCUMENTS

2007/0115228 A1  5/2007  Roberts et al.
2010/0103649 A1  4/2010  Hamada

FOREIGN PATENT DOCUMENTS

| JP | 2004-103993 A | 4/2004 |
| JP | 2007-35890 A | 2/2007 |
| JP | 2009-516358 A | 4/2009 |
| WO | 2008/090643 A1 | 7/2008 |

OTHER PUBLICATIONS

Official Communication issued in International Patent Application No. PCT/JP2010/070619, mailed on Feb. 1, 2011.

*Primary Examiner* — Phu Vu
(74) *Attorney, Agent, or Firm* — Keating & Bennett, LLP

(57) ABSTRACT

Provided is an LED substrate including a plurality of LEDs that is capable of being downsized in width. An LED substrate (20) includes a radiating plate (22) made from metal, an insulating layer (23), a plurality of LEDs (21) disposed linearly along a longitudinal direction of the radiating plate and connected to each other in series, and first and second ground patterns (33, 34) disposed at left and right ends of the LED substrate, wherein the first and second ground patterns are electrically connected to the radiating plate, which is disposed under the first and second ground patterns while sandwiching therebetween the insulating layer, via sheet-metal screws (71, 72).

16 Claims, 12 Drawing Sheets

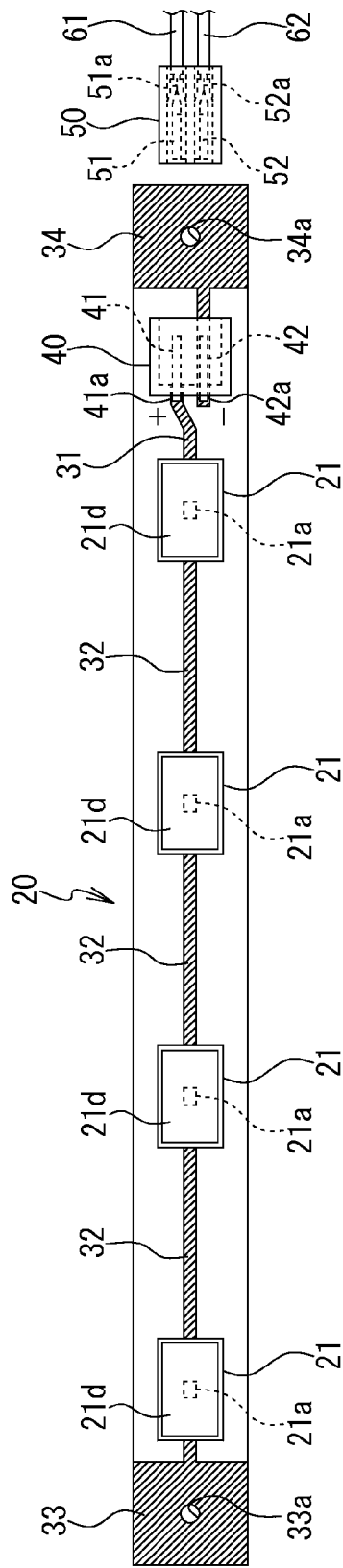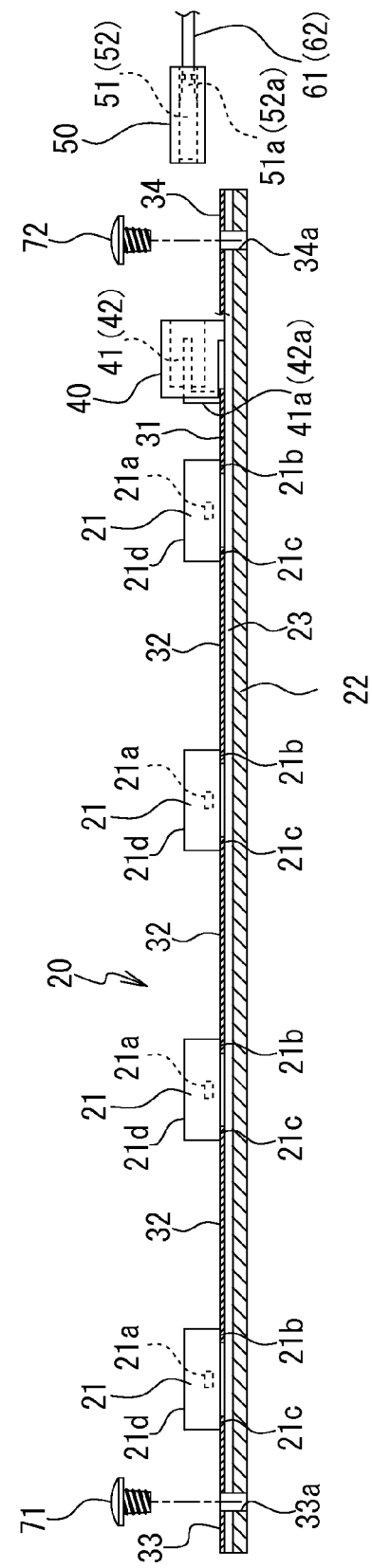

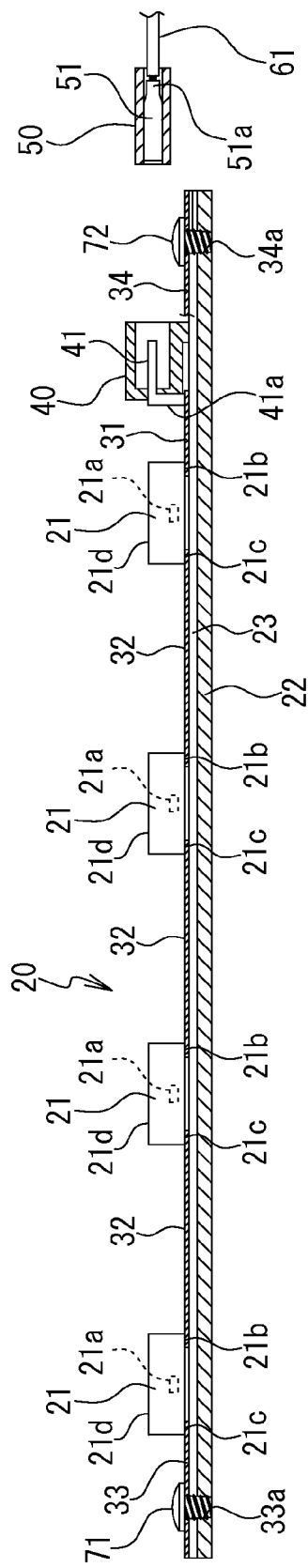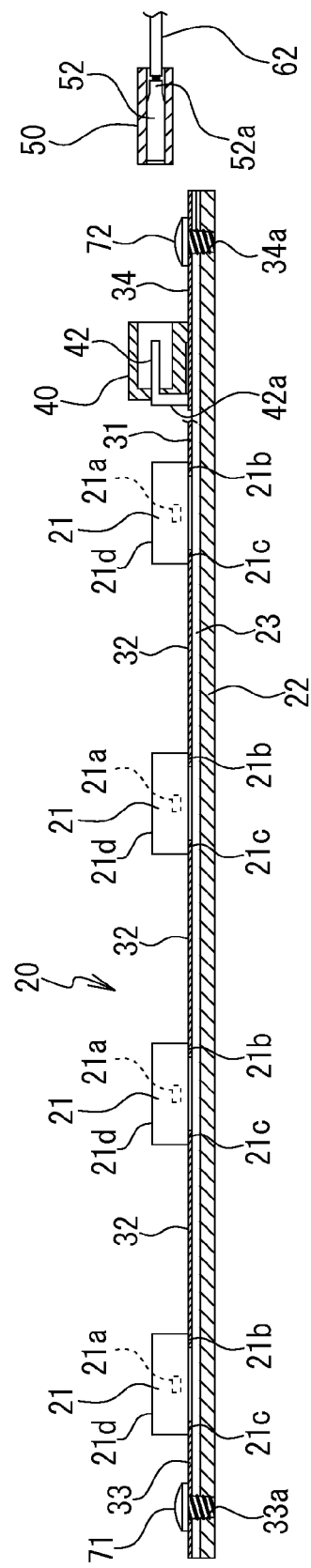
FIG. 6A
FIG. 6B

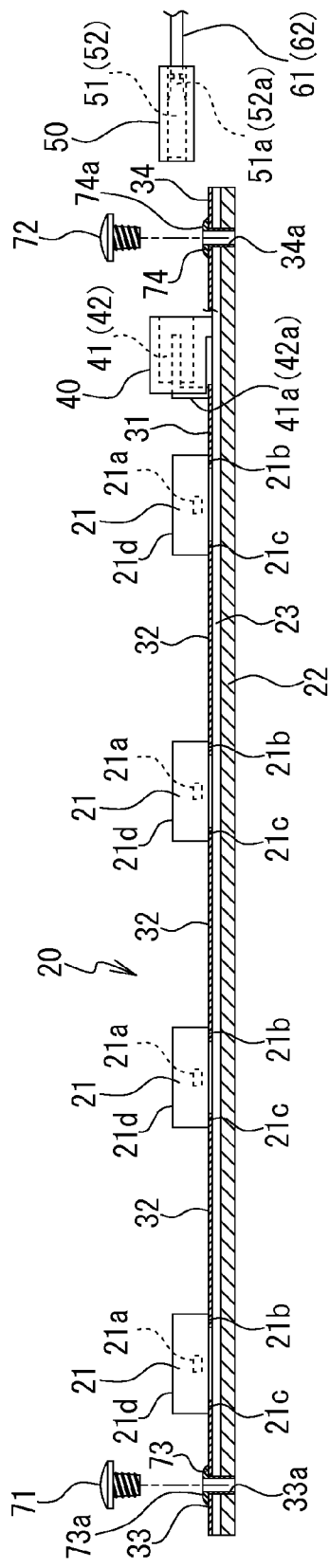
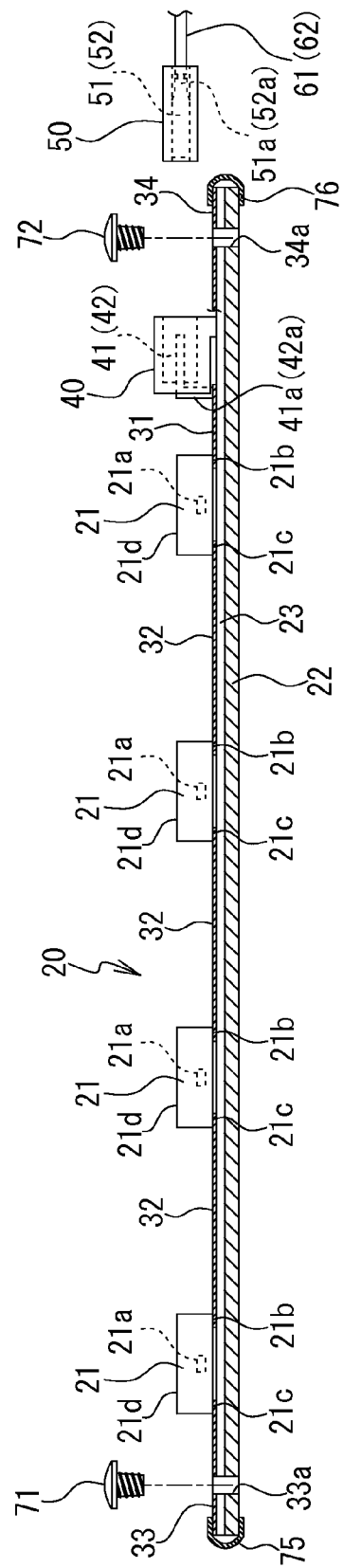
FIG. 9A
FIG. 9B

LED SUBSTRATE, BACKLIGHT UNIT, AND LIQUID CRYSTAL DISPLAY DEVICE

TECHNICAL FIELD

The present invention relates to an LED substrate including a plurality of LEDs, a backlight unit including the LED substrate, and a liquid crystal display device including a liquid crystal display panel and the backlight unit that is disposed behind the liquid crystal display panel.

BACKGROUND ART

A liquid crystal display device including a transmissive liquid crystal display panel includes a backlight unit that is disposed behind the liquid crystal display panel to project light thereonto. Aside (edge) backlight unit is known as this kind of backlight unit, which includes a light guide plate having a plate shape that is made from a transparent material such as an acrylate resin, and a light source that includes a cold cathode tube (fluorescent lamp) or an LED (Light-Emitting Diode) that is disposed along one side or more than one side of the light guide plate. The side backlight unit described above has an advantage such that a thin profile thereof can be easily achieved compared with a direct backlight unit including a light source disposed behind a liquid crystal display panel.

In particular, a liquid crystal display device that includes an LED as a light source of a side backlight unit has the advantages of long life and high luminous efficiency, and thus has been receiving attention. FIG. 10 is an exploded perspective view showing a schematic configuration of a liquid crystal display device including this kind of side backlight unit including LEDs. FIG. 11 is a cross-sectional view showing a relevant portion of the same.

As shown in FIG. 10, a liquid crystal display device 100 includes a bezel 102, a liquid crystal display panel 103, and a backlight unit 104.

The bezel 102 has a square frame shape with an opening so as to cover edge portions of the liquid crystal display panel 103, and is arranged to, together with a backlight chassis 114, ensure strength of the entire liquid crystal display device 100. The liquid crystal display panel 103 includes two glasses that are bonded together, and liquid crystals are filled in a space between the glasses. The liquid crystal display panel 103 is capable of displaying an image on its front face.

The backlight unit 104 includes the backlight chassis 114 having the shape of a box of low height. The chassis 114 houses optical sheets 107 to 109, a light guide plate 111, a reflection sheet 113, and two LED substrates 120.

As shown in FIG. 11, the light guide plate 111 includes a light incidence surface 111a arrange to obtain light from the LEDs 121 of the LED substrates 120, and a light emitting surface 111b arrange to emit the light upward (in a direction to project the light), which is obtained from the light incidence surface 111a. The light incidence surface 111a is defined by a given side surface of the light guide plate 111, and the light emitting surface 111b is defined by a front surface of the light guide plate 111.

The reflection sheet 113 is disposed so as to cover a back surface 111c of the light guide plate 111, which is the opposite surface to the light emitting surface 111b. The optical sheets 107 to 109 define optical sheets such as a diffusion sheet and a lens sheet, and are disposed above the light emitting surface 111b of the light guide plate 111.

The optical sheets 107 to 109, the light guide plate 111 and the reflection sheet 113 are stacked and fixed onto a bottom plate 114a of the backlight chassis 114 by a frame 105.

In addition, the LEDs 121 provided to the LED substrates 120 are disposed close to the light incidence surface 111a of the light guide plate 111. Further, light emitting surfaces 121d of the LEDs 121 are disposed along the light incidence surface 111a of the light guide plate 111, having a given space therebetween so as to be opposed to the light incidence surface 111a. In this case, the two LED substrates 120 are fixed so as to be disposed laterally while standing on a fixing plate 115 having the shape of the letter "L" that is provided so as to stand on the bottom plate 114a in the vicinity of a side wall 114b of the backlight chassis 114.

Each LED substrate 120 includes wiring patterns 131, 132 and 133 that are formed on a radiating plate made from metal such as aluminum while sandwiching therebetween an insulating layer, and the LEDs 121 are disposed on each LED substrate 120 so as to be connected to the wiring patterns 131, 132 and 133, as shown in FIG. 12.

In this case, four LEDs 121 are disposed linearly along a longitudinal direction of each LED substrate 120, and connected to one another in series by the connecting patterns 132.

The first LED 121 from the right end of each LED substrate 120 is connected to one end of the light source pattern 131. The other end of the light source pattern 131 is connected to a light-source-side terminal (positive terminal) 141 of a substrate connector 140 disposed at the right end of each LED substrate 120.

The first LED 121 from the left end of each LED substrate 120 (the fourth LED 121 from the right end) is connected to one end of the ground pattern 133. The other end of the ground pattern 133, which extends from the left end of each LED substrate 120 so as to be folded back in a rightward direction along the longitudinal direction of each LED substrate 120, is connected to a ground-side terminal (negative terminal) 142 of the substrate connector 140.

In this case, the substrate connector 140 has a configuration of being connected to a power substrate 118 included in the liquid crystal display device 100 via a cable connector 150 and cables 161 and 162 arranged to be fitted and connected to the substrate connector 140. A prior art literature of the present invention relates to is provided below.

CITATION LIST

Patent Literature

PTL 1: JP2004-103993

SUMMARY OF INVENTION

Technical Problem

However, because each of these LED substrates 120 has a configuration of including the ground pattern 133 that is adjacent to the LEDs 121, which are disposed linearly along the longitudinal direction of the LED substrate 120 and connected to one another in series, in a width direction of the LED substrate 120, and extends in the longitudinal direction of the LED substrate 120, there is a problem in downsizing the LED substrates 120 in the width direction (direction perpendicular to the longitudinal direction).

Because of this configuration, the width of the LED substrates 120 is much wider than the width of the LEDs 121 included on the LED substrates 120. Thus, the backlight chassis 114 has a configuration such that a convex portion 114c, which defines a portion of the bottom plate 114a that is protruded downward by a width for including the ground patterns 133 of the LED substrates 120, is provided, the fixing plate 115 stands on the convex portion 114c, and the LED substrates 120 are fixed to the fixing plate 115, as shown in FIG. 11. However, the convex portion 114c, which is protruded downward from the bottom plate 114a of the backlight chassis 114, hinders achieving a thin profile of the backlight unit 104, in other words, hinders achieving a thin profile of the liquid crystal display device 100.

In particular, a thin profile of the liquid crystal display device 100 has been highly required recently in order to improve the design property of a liquid crystal display device such as a wall-hanging liquid crystal display device, so that the LED substrates 120 are desired to be downsized in width.

The present invention is made in view of the problems described above, and an object of the present invention is to provide an LED substrate including a plurality of LEDs that is capable of being downsized in width, a backlight unit including the LED substrate, and a liquid crystal display device including the backlight unit.

Solution to Problem

To achieve the objects and in accordance with the purpose of the present invention, an LED substrate of a preferred embodiment of the present invention includes a long radiating plate made from metal, an insulating layer disposed on an upper surface of the radiating plate, a plurality of LEDs disposed on an upper surface of the insulating layer linearly along a longitudinal direction of the radiating plate and connected to each other in series, a light source pattern disposed at one end on the upper surface of the insulating layer and connected to the first LED from the one end, a first ground pattern disposed at the other end on the upper surface of the insulating layer and connected to the first LED from the other end, and a connector disposed at the one end on the upper surface of the insulating layer and including a light-source-side terminal and a ground-side terminal, wherein the LED substrate further includes a second ground pattern disposed at the one end on the upper surface of the insulating layer, wherein the light source pattern is connected to the light-source-side terminal of the connector, wherein the second ground pattern is connected to the ground-side terminal of the connector, wherein the first ground pattern is connected to the radiating plate via a first screw made from metal that is inserted in a first through-hole provided to the first ground pattern and the radiating plate, and wherein the second ground pattern is connected to the radiating plate via a second screw made from metal that is inserted in a second through-hole provided to the second ground pattern and the radiating plate.

It is preferable that the metal from which the radiating plate is made defines aluminum, and the first and second screws define sheet-metal screws. In addition, it is preferable that conductive pastes are applied to inner surfaces of the first and second through-holes.

It is preferable that the LED substrate further includes a first conductive tape, one end of which is attached to the first ground pattern, and the other end is attached to the radiating plate, wherein the first ground pattern and the radiating plate are connected via the first conductive tape, and a second conductive tape, one end of which is attached to the second ground pattern, and the other end is attached to the radiating plate, wherein the second ground pattern and the radiating plate are connected via the second conductive tape.

In another aspect of the present invention, a backlight unit of a preferred embodiment of the present invention includes a light guide plate having a plate shape, an LED substrate disposed on a side surface of the light guide plate, and a chassis made from metal and arranged to house the light guide plate and the LED substrate, wherein the LED substrate includes a long radiating plate made from metal, an insulating layer disposed on an upper surface of the radiating plate, a plurality of LEDs disposed on an upper surface of the insulating layer linearly along a longitudinal direction of the radiating plate and connected to each other in series, a light source pattern disposed at one end on the upper surface of the insulating layer and connected to the first LED from the one end, a first ground pattern disposed at the other end on the upper surface of the insulating layer and connected to the first LED from the other end, and a connector disposed at the one end on the upper surface of the insulating layer and including a light-source-side terminal and a ground-side terminal, wherein the LED substrate further includes a second ground pattern disposed at the one end on the upper surface of the insulating layer, wherein the light source pattern is connected to the light-source-side terminal of the connector, wherein the second ground pattern is connected to the ground-side terminal of the connector, wherein the first ground pattern is connected to the radiating plate via a first screw made from metal that is inserted in a first through-hole provided to the first ground pattern and the radiating plate, and wherein the second ground pattern is connected to the radiating plate via a second screw made from metal that is inserted in a second through-hole provided to the second ground pattern and the radiating plate.

It is preferable that the metal from which the radiating plate is made defines aluminum, and the first and second screws define sheet-metal screws. In addition, it is preferable that conductive pastes are applied to inner surfaces of the first and second through-holes.

It is preferable that the backlight unit further includes a first conductive tape, one end of which is attached to the first ground pattern, and the other end is attached to the radiating plate, wherein the first ground pattern and the radiating plate are connected via the first conductive tape, and a second conductive tape, one end of which is attached to the second ground pattern, and the other end is attached to the radiating plate, wherein the second ground pattern and the radiating plate are connected via the second conductive tape.

It is preferable that the backlight unit further includes a fixing plate made from metal that is disposed to stand on the chassis, wherein the LED substrate is fixed to the fixing plate by the first and second screws, and wherein the radiating plate is electrically connected to the chassis via the fixing plate.

It is preferable that the backlight unit further includes a thermal conductive sheet disposed between the fixing plate and the radiating plate of the LED substrate. It is also preferable that the thermal conductive sheet possesses electrical conductivity.

Yet, in another aspect of the present invention, a liquid crystal display device of a preferred embodiment of the present invention includes a liquid crystal display panel, and the backlight unit of the above-described embodiment of the present invention that is disposed behind the liquid crystal display panel.

Advantageous Effects of Invention

In the LED substrate, the backlight unit and the liquid crystal display device having the configurations described above, the radiating plate, which is made from metal and disposed under the LEDs that are connected in series while sandwiching therebetween the insulating layer, is used as a ground wire for the LEDs. Thus, it is unnecessary to provide a ground pattern shown in FIG. 12 and explained above in the description of Background Art, which is adjacent to the LEDs, which are disposed linearly along the longitudinal direction of the LED substrate and connected to one another in series, in the width direction of the LED substrate, and extends linearly along the longitudinal direction of the LED substrate.

Thus, downsizing (decreasing) in width of the LED substrate by a width that is required in order to include the ground pattern disposed linearly along the longitudinal direction of the LED substrate can be achieved, whereby a thin profile of the backlight unit, in other words, a thin profile of the liquid crystal display device can be achieved, which improves the design property of the liquid crystal display device.

BRIEF DESCRIPTION OF DRAWINGS

FIG. 5A is a front plan view showing the LED substrate shown in FIG. 3, and FIG. 5B is a cross-sectional view of the same.

FIG. 6A is a cross-sectional view showing the LED substrate shown in FIG. 5B on the side of a light-source-side terminal of a substrate connector, where sheet-metal screws are inserted in the LED substrate, and FIG. 6B is a cross-sectional view showing the LED substrate shown in FIG. 5B on the side of a ground-side terminal of the substrate connector, where the sheet-metal screws are inserted in the LED substrate.

FIG. 9A is a cross-sectional view showing the LED substrate of a first modified embodiment, and FIG. 9B is a cross-sectional view showing the LED substrate of a second modified embodiment.

DESCRIPTION OF EMBODIMENTS

A detailed description of an LED substrate, a backlight unit, and a liquid crystal display device of preferred embodiments of the present invention will now be provided with reference to the accompanying drawings.

Figure 1:
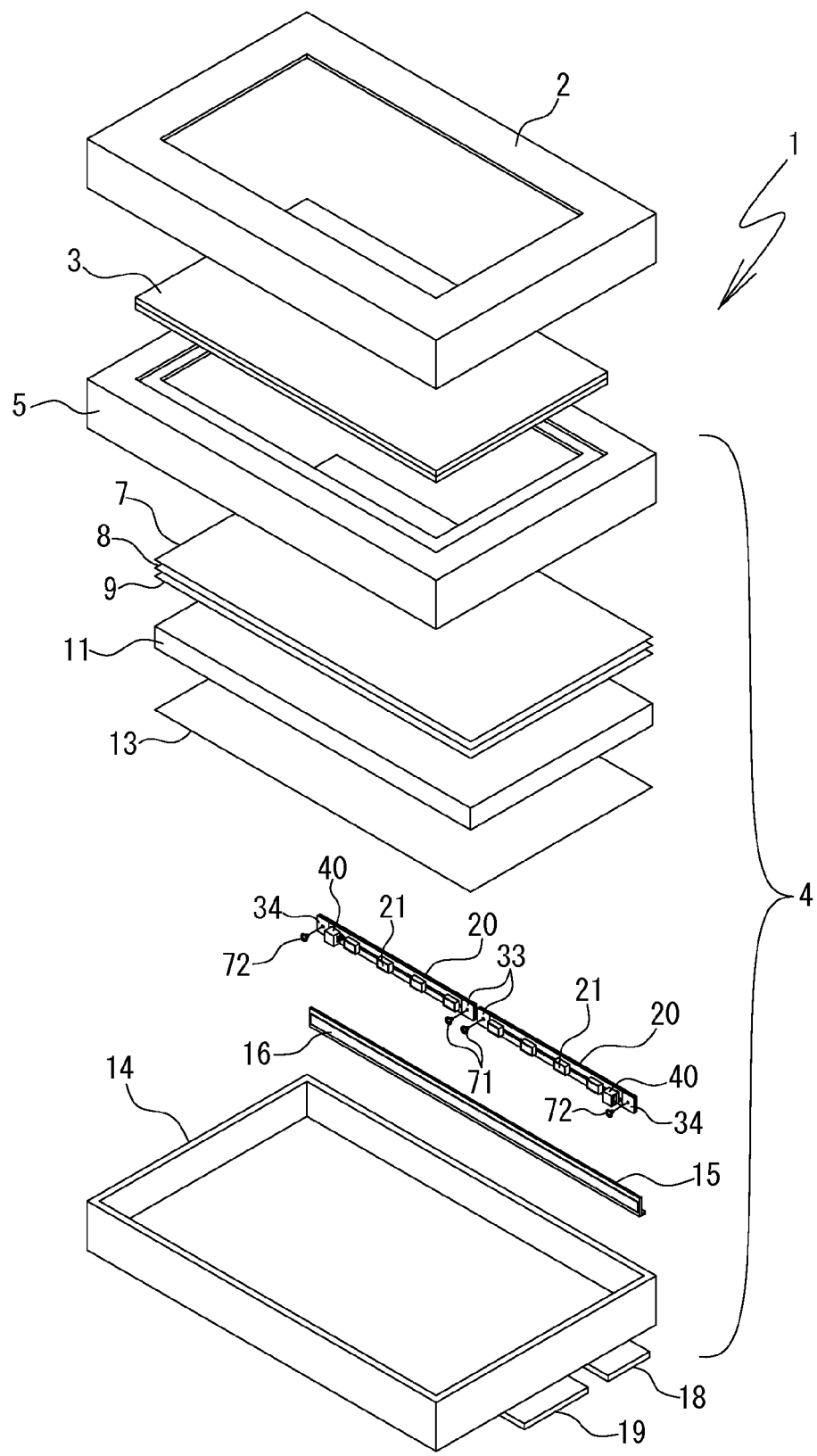
FIG. 1 is an exploded perspective view showing a schematic configuration of a liquid crystal display device of a preferred embodiment of the present invention.
Figure 2:
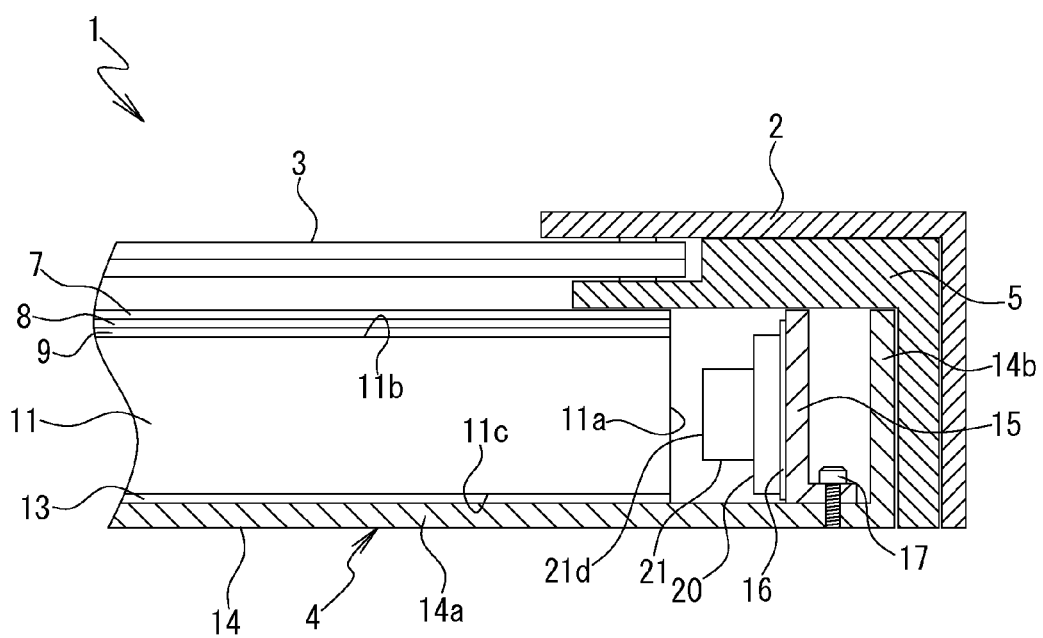
FIG. 2 is an enlarged cross-sectional view showing a relevant portion of the liquid crystal display device shown in FIG. 1 after being assembled.
Figure 3:
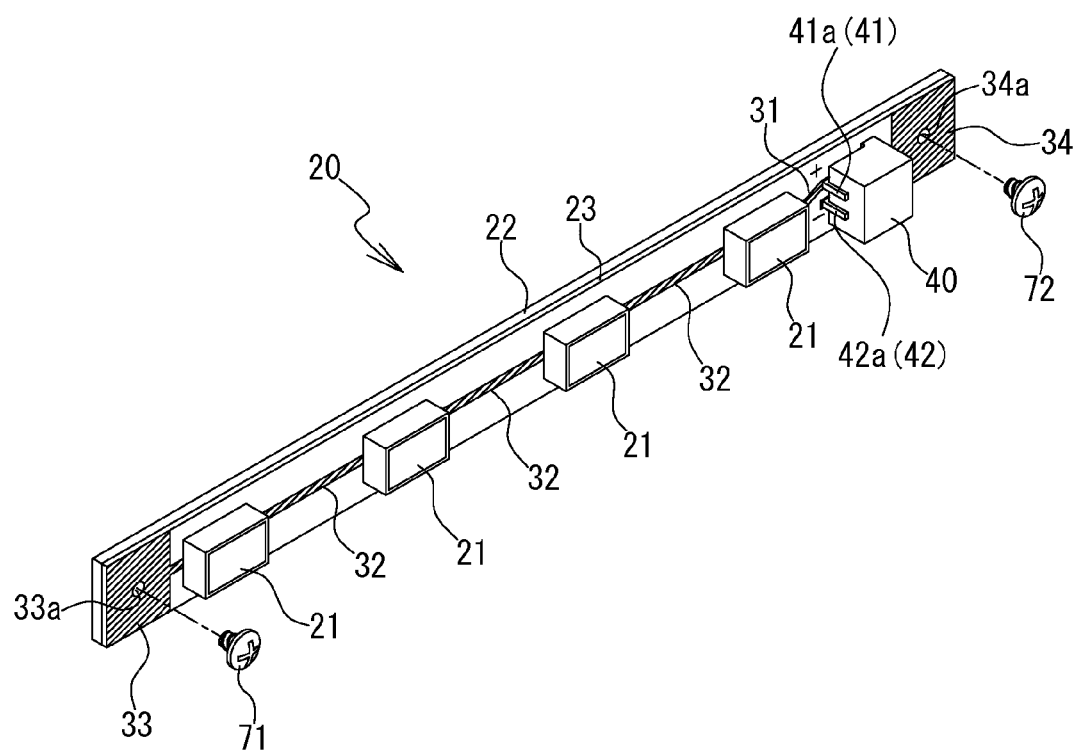
FIG. 3 is an external perspective view showing a schematic configuration of an LED substrate of a preferred embodiment of the present invention.
Figure 4:
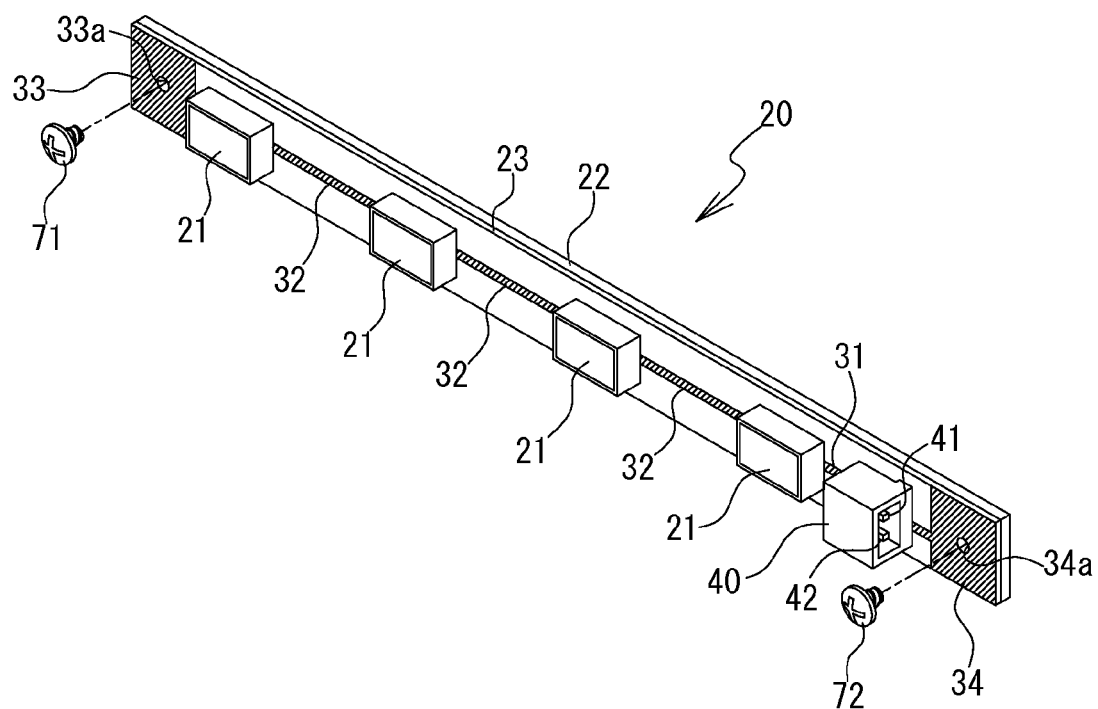
FIG. 4 is an external perspective view showing the LED substrate shown in FIG. 3, which is seen from a different angle.

FIG. 1 is an exploded perspective view showing a schematic configuration of a liquid crystal display device 1 of a preferred embodiment of the present invention. FIG. 2 is an enlarged cross-sectional view showing a relevant portion of the liquid crystal display device 1. The liquid crystal display device 1 includes a bezel 2, a liquid crystal display panel 3 and a backlight unit 4 as shown in FIGS. 1 and 2.

The bezel 2 has a square frame shape with an opening so as to cover edge portions of the liquid crystal display panel 3, and is arranged to, together with a backlight chassis 14 to be described later, ensure strength of the entire liquid crystal display device 1. The liquid crystal display panel 3 includes two glasses that are bonded together, and liquid crystals are filled in a space between the glasses. The liquid crystal display panel 3 is capable of displaying an image on its front surface.

The backlight unit 4 defines a so-called side (edge) illuminating device. The backlight unit 4 includes a frame 5, optical sheets 7 to 9, a light guide plate 11, a reflection sheet 13, the backlight chassis 14, a fixing plate 15, and two LED substrates 20 as shown in FIG. 1. The frame 5 has a square frame shape with an opening, and is arranged to fix the optical sheets 7 to 9, the light guide plate 11 and the reflection sheet 13, which are stacked in this order from the top, to the backlight chassis 14. The optical sheets 7 to 9, the light guide plate 11 and the reflection sheet 13 define optical members arranged to adjust the properties (e.g., refraction, diffraction, reflection) of light that enters the liquid crystal display panel 3 from LEDs 21 included on the LED substrates 20.

The backlight chassis 14 is made of a metal plate such as aluminum that possesses electrical conductivity. The backlight chassis 14 has the shape of a box of low height that is formed through bending processing of the metal plate. The backlight chassis 14 houses the optical sheets 7 to 9, the light guide plate 11, the reflection sheet 13, the fixing plate 15, and the LED substrates 20.

The light guide plate 11 has a rectangular shape when seen in a plan view, and is preferably made of a transparent plate having a thickness of about 3 to 4 mm. The light guide plate 11 includes a light incidence surface 11a arrange to obtain light from the LEDs 21, and a light emitting surface 11b arrange to emit the light upward (in a direction to project the light) obtained from the light incidence surface 11a. The light incidence surface 11a is defined by a given side surface of the light guide plate 11, and the light emitting surface 11b is defined by a front surface of the light guide plate 11.

The light guide plate 11 is arranged to repeatedly reflect the light, which enters from the light incidence surface 11a, between the light emitting face (front face) 11b and a back surface 11c, which is the opposite surface to the light emitting surface 11b, to planarly diffuse the light inside the light guide plate 11. The light guide plate 11 includes a plurality of scattering members (not shown) on the back surface 11c, which are arranged to scatter the light, which enters from the light incidence surface (side surface) 11a, and emit the light from the light emitting surface (front surface) 11b. The scattering members are preferably provided thereon by dotting paint containing a white pigment in a printing method on the back surface 11c of the light guide plate 11, or are preferably provided thereon by forming a plurality of concave portions on the back surface 11c of the light guide plate 11.

In addition, the LEDs 21 provided to the LED substrates 20 are disposed close to the light incidence surface 11a of the light guide plate 11. Further, light emitting surfaces 21d of the LEDs 21 are disposed along the light incidence surface 11a of the light guide plate 11, having a given space therebetween so as to be opposed to the light incidence surface 11a. In the present embodiment, the two LED substrates 20 are fixed so as to be disposed laterally while standing (erecting) on the fixing plate 15 having the shape of the letter "L" that is provided so as to stand on a bottom plate 14*a* in the vicinity of a side wall 14*b* of the backlight chassis 14.

The reflection sheet 13 is disposed so as to cover the back surface 11*c*, which is the opposite surface to the light emitting surface 11*b*. In the present embodiment, the reflection sheet 13 is disposed on the bottom plate 14*a* of the backlight chassis 14. The reflection sheet 13 is arranged to reflect the light, which is emitted from the back surface 11*c* of the light guide plate 11, toward the light guide plate 11. The reflection sheet 13 preferably defines a resin sheet having a thickness of about 0.1 to 2 mm. The reflection sheet 13 is preferably painted white to increase use efficiency of the light and to enhance brightness of the light on the light emitting surface 11*b* of the light guide plate 11 by efficiently reflecting the light, which is emitted from the back surface 11*c* of the light guide plate 11, toward the light guide plate 11.

The three optical sheets 7 to 9 define resin sheets, which have a thin rectangular shape when seen in a plan view. The three optical sheets 7 to 9 are defined by a stack of the polarization selective reflection sheet 7, the lens sheet 8, and the diffusion sheet 9, which have a thickness of about 0.1 to 0.5 mm, and are stacked in this order from the top and disposed on the light guide plate 11.

In the present embodiment, the diffusion sheet 9 is used to diffuse the light emitted from the light guide plate 11, allowing uniformalization of brightness distribution of the light. The lens sheet 8 is used to gather the light emitted from the diffusion sheet 9, allowing enhancement of front brightness of the light. The polarization selective reflection sheet 7 is used to selectively reflect the light emitted from the lens sheet 8 so that the light is not absorbed by a polarizing plate (not shown) that is attached on the underside of the liquid crystal display panel 3.

The backlight unit 4 is capable of converting the light from the LEDs 21 into planate light with the use of the optical sheets 7 to 9, the light guide plate 11 and the reflection sheet 13, and projecting the light onto a back surface of the liquid crystal display panel 3. A power board 18 arranged to supply power to the LED substrates 20, and a control board 19 arranged to drive the liquid crystal display panel 3 are provided behind the backlight chassis 4.

Next, a description of the LED substrates 20 of the present embodiment of the present invention will be provided with reference to FIGS. 3 to 6B. Each of the LED substrates 20 includes a radiating plate 22 made from metal such as aluminum that possesses electrical conductivity as shown in FIGS. 3 to 6B. The radiating plates 22 have a long rectangular shape. Insulating layers 23 are disposed on upper surfaces of the radiating plates 22. The plurality of LEDs 21 (four LEDs 21 per LED substrate 20) in the present embodiment) disposed linearly along a longitudinal direction of the LED substrates 20 (the radiating plate 22) are disposed on the insulating layers 23.

In the present embodiment, the radiating plates 22 function as base members of the LED substrates 20, and function to curb an increase in temperature caused by heat generation of the LEDs 21. The radiating plates 22 are attached and fixed to the fixing plate 15 while sandwiching therebetween a thermal conductive sheet 16 that has adhesive faces on both sides. The fixing plate 15 has the shape of the letter "L", is made from metal such as aluminum that possesses electrical conductivity, and is disposed so as to stand on the bottom plate 14*a* of the backlight chassis 14 (see FIG. 2).

Thus, the heat generated by the LEDs 21 is conveyed to the bottom plate 14*a* of the backlight chassis 14 via the radiating plates 22 of the LED substrates 20, the thermal conductive sheet 16 and the fixing plate 15, so that the temperature of the LEDs 21 is curbed not to increase excessively. The fixing plate 15 is attached to the bottom plate 14*a* of the backlight chassis 14 by a fixation screw 17.

Each of the LEDs 21 has a package structure such that an LED chip 21*a* that emits blue light is encapsulated in a transparent resin into which a yellow fluorescent material is mixed, for example, and is capable of emitting white light from its top surface, i.e., the light emitting surface 21*d*. In the present embodiment, the light emitting surfaces 21*d* are disposed parallel to plate faces (surfaces) of the LED substrates 20.

A second ground pattern 34, a light source pattern 31, three connecting patterns 32, and a first ground pattern 33 that define wiring patterns are provided in this order from the right on each insulating layer 23 as shown in FIGS. 3, 4, 5A and 5B. The four LEDs 21 are connected to one another in series by the three connecting patterns 32.

To be specific, a negative electrode (cathode electrode) 21*c* of the first LED 21 from the right and a positive electrode (anode electrode) 21*b* of the second LED 21 from the right are connected by the connecting pattern 32, a negative electrode (cathode electrode) 21*c* of the second LED 21 from the right and a positive electrode (anode electrode) 21*b* of the third LED 21 from the right are connected by the connecting pattern 32, and a negative electrode (cathode electrode) 21*c* of the third LED 21 from the right and a positive electrode (anode electrode) 21*b* of the fourth LED 21 from the right are connected by the connecting pattern 32, as shown in FIG. 5B.

A white coating such as a white solder resist is printed on the surfaces of the LED substrates 20 in a silk printing method so that the surfaces are coated with the coating (not shown). The silk printing method is defined by a method of covering a subject to be printed with a silk that functions as a screen, in which an opening with a given pattern is formed, and then printing ink in the subject through the opening, which is also called as a silk screening method.

In the present embodiment, the white coating is printed on the surface of each LED substrate 20 except the areas where the LEDs 21 and the first and second ground patterns 33, 34 are disposed. Thus, the white coating reflects the light that comes back to the LED substrates 20 from the light incidence surface 11*a* of the light guide plate 11, which increases use efficiency of the light.

In addition, a substrate connector 40 is provided to each LED substrate 20. The substrate connector 40 is disposed between the second ground pattern 34 that is disposed at the right end of each LED substrate 20, and the first LED 21 from the right end of each LED substrate 20. The substrate connectors 40 are used to supply electric source (power) to the LEDs 21, and each substrate connector 40 includes a male light-source-side terminal (positive terminal) 41, and a male ground-side terminal (negative terminal) 42.

In the present embodiment, the substrate connectors 40 have a configuration of being connected to the power board 18 of the liquid crystal display device 1 via cable connectors 50 and cables 61, 62 arranged to be fitted and connected to the substrate connectors 40.

Each cable connector 50 includes a female light-source-side terminal (positive terminal) 51 and a ground-side terminal (negative terminal) 52, which are arranged to be fitted and electrically connected to the light-source-side terminal 41 and the ground-side terminal 42 of each substrate connector 40, respectively, as shown in FIG. 5A. A crimping portion 51*a* of the light-source-side terminal 51 of each cable connector 50 is connected to an end portion of the light-source-side cable 61, while a crimping portion 52a of the ground-side terminal 52 of each cable connector 50 is connected to an end portion of the ground-side cable 62 as shown in FIGS. 6A and 6B.

The light source pattern 31 is connected to the positive electrode (anode electrode) 21b of the first LED 21 from the right, and is also connected to a tip 41a of the light-source-side terminal (positive terminal) 41 of the substrate connector 40 as shown in FIGS. 5A and 6A.

In addition, the second ground pattern 34 having a square shape (a substantially rectangular shape) that is disposed at the right end of each LED substrate 20 is connected to a tip 42a of the ground-side terminal (negative terminal) 42 of the substrate connector 40 as shown in FIGS. 5A and 6B.

Further, the first ground pattern 33 having a square shape (a substantially rectangular shape) that is disposed at the left end of each LED substrate 20 is connected to the negative electrode (cathode electrode) 21c of the first LED 21 from the left end (fourth LED 21 from the right end) of each LED substrate 20 as shown in FIGS. 5A and 6B.

A first through-hole 33a that goes through the first ground pattern 33, the insulating layer 23 and the radiating plate 22 is formed in the middle of the first ground pattern 33 as shown in FIGS. 5A and 5B. In addition, a second through-hole 34a that goes through the second ground pattern 34, the insulating layer 23 and the radiating plate 22 is formed in the middle of the second ground pattern 34.

In each LED substrate 20 having the configuration described above, the light-source-side terminal 41 of the substrate connector 40 is electrically connected to the LEDs 21 by the light source pattern 31 and the connecting patterns 32, while the first ground pattern 33 is not connected to the second ground pattern 34. Thus, the negative electrode (cathode electrode) 21c of the first LED 21 from the left end (fourth LED 21 from the right end) of each LED substrate 20 is yet to be connected to the ground-side terminal 42 of the substrate connector 40.

Thus, a first sheet-metal screw 71 and a second sheet-metal screw 72 that are made from metal that possesses electrical conductivity are inserted into the first through-hole 33a of the first ground pattern 33 and the second through-hole 34a of the second ground pattern 34, respectively, so that the first ground pattern 33 is electrically connected to the radiating plate 22 disposed thereunder via the first sheet-metal screw 71, and the second ground pattern 34 is electrically connected to the radiating plate 22 disposed thereunder via the second sheet-metal screw 72, which allows the first ground pattern 33 and the second ground pattern 34 to be electrically connected to each other via the first sheet-metal screw 71, the radiating plate 22 and the second sheet-metal screw 72, as shown in FIGS. 5B, 6A and 6B.

Thus, the four LEDs 21 that are connected in series are made connected in series between the light-source-side terminal 41 and the ground-side terminal 42 of the substrate connector 40 as shown in FIGS. 6A and 6B.

Figure 12:
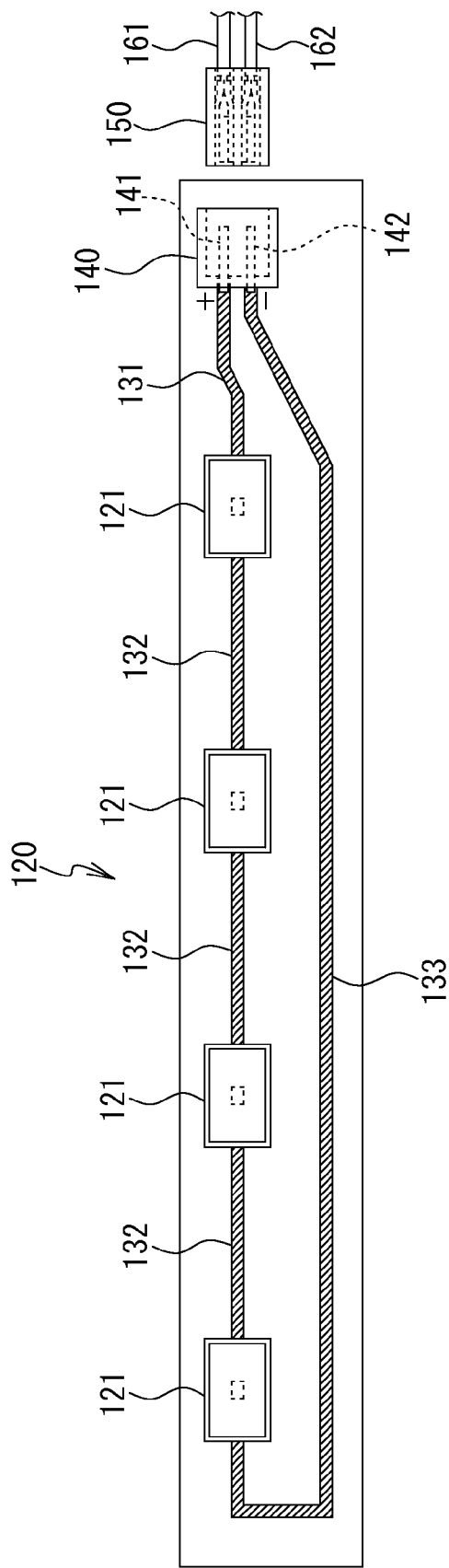
FIG. 12 is a front plan view showing a conventional LED substrate.

In other words, because each LED substrate 20 has the configuration that the first ground pattern 33 disposed at the left end of the LED substrate 20 and the second ground pattern 34 disposed at the right end of the LED substrate 20 are electrically connected to each other via the first sheet-metal screw 71, the radiating plate 22 and the second sheet-metal screw 72, it is unnecessary to provide the ground pattern 133 shown in FIG. 12 and explained above in the description of Background Art, which is adjacent to the LEDs 121, which are connected to one another in series in the longitudinal direction of the LED substrate 120, in the width direction of the LED substrate 120, and extends along the longitudinal direction of the LED substrate 120.

Thus, downsizing (decreasing) in width of each LED substrate 20 by a width that is required in order to include the conventional ground pattern 133 disposed linearly along the longitudinal direction of the LED substrate 120 can be achieved by using the radiating plate 22 made from metal as a ground wire for the LEDs 21, the radiating plate 22 being disposed under the LEDs 21 connected in series while sandwiching therebetween the insulating layer 23.

Figure 11:
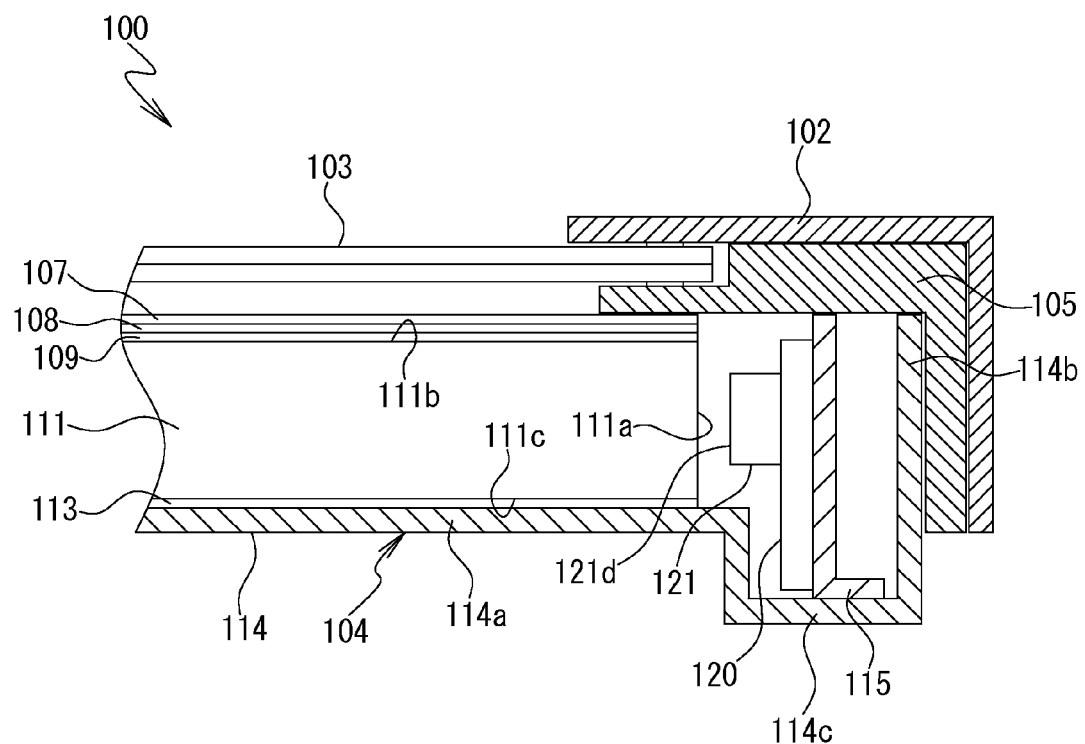
FIG. 11 is an enlarged cross-sectional view showing a relevant portion of the liquid crystal display device shown in FIG. 8 after being assembled.

That is, downsized in their width direction (direction perpendicular to the longitudinal direction), the LED substrates 20 can be housed in the backlight chassis 14 as shown in FIG. 2 without providing the convex portion 114c shown in FIG. 11 and explained above in the description of Background Art, which defines the portion protruded downward from the bottom plate 114a of the backlight chassis 114.

Thus, the height of the backlight chassis 14 (the height from the bottom plate 14a) can be reduced compared with a conventional backlight chassis as shown in FIG. 2, which can achieve a thin profile of the backlight unit 4, and a thin profile of the liquid crystal display device 1.

It is also preferable to have a configuration such that normally-used screw holes are provided instead of the first through-hole 33a of the first ground pattern 33 and the second through-hole 34a of the second ground pattern 34, and normally-used screws are provided instead of the first sheet-metal screw 71 and the second sheet-metal screw 72.

In the present embodiment, by inserting the first sheet-metal screw 71 into the first through-hole 33a of the first ground pattern 33 to electrically connect the first ground pattern 33 and the radiating plate 22 disposed under the first ground pattern 33, a thread of the first sheet-metal screw 71 is engaged in the inner surface of the first through-hole 33a to be transformed to a female screw. Thus, it is unnecessary to form the first through-hole 33a as a screw hole. In addition, the first sheet-metal screw 71 can be electrically connected to the radiating plate 22 in a convincing way.

In addition, in a similar manner, by inserting the second sheet-metal screw 72 into the second through-hole 34a of the second ground pattern 34 to electrically connect the second ground pattern 34 and the radiating plate 22 disposed under the second ground pattern 34, a thread of the second sheet-metal screw 72 is engaged in the inner surface of the second through-hole 34a to be transformed to a female screw. Thus, it is unnecessary to form the second through-hole 34a as a screw hole. In addition, the second sheet-metal screw 72 can be electrically connected to the radiating plate 22 in a convincing way.

Figure 7:
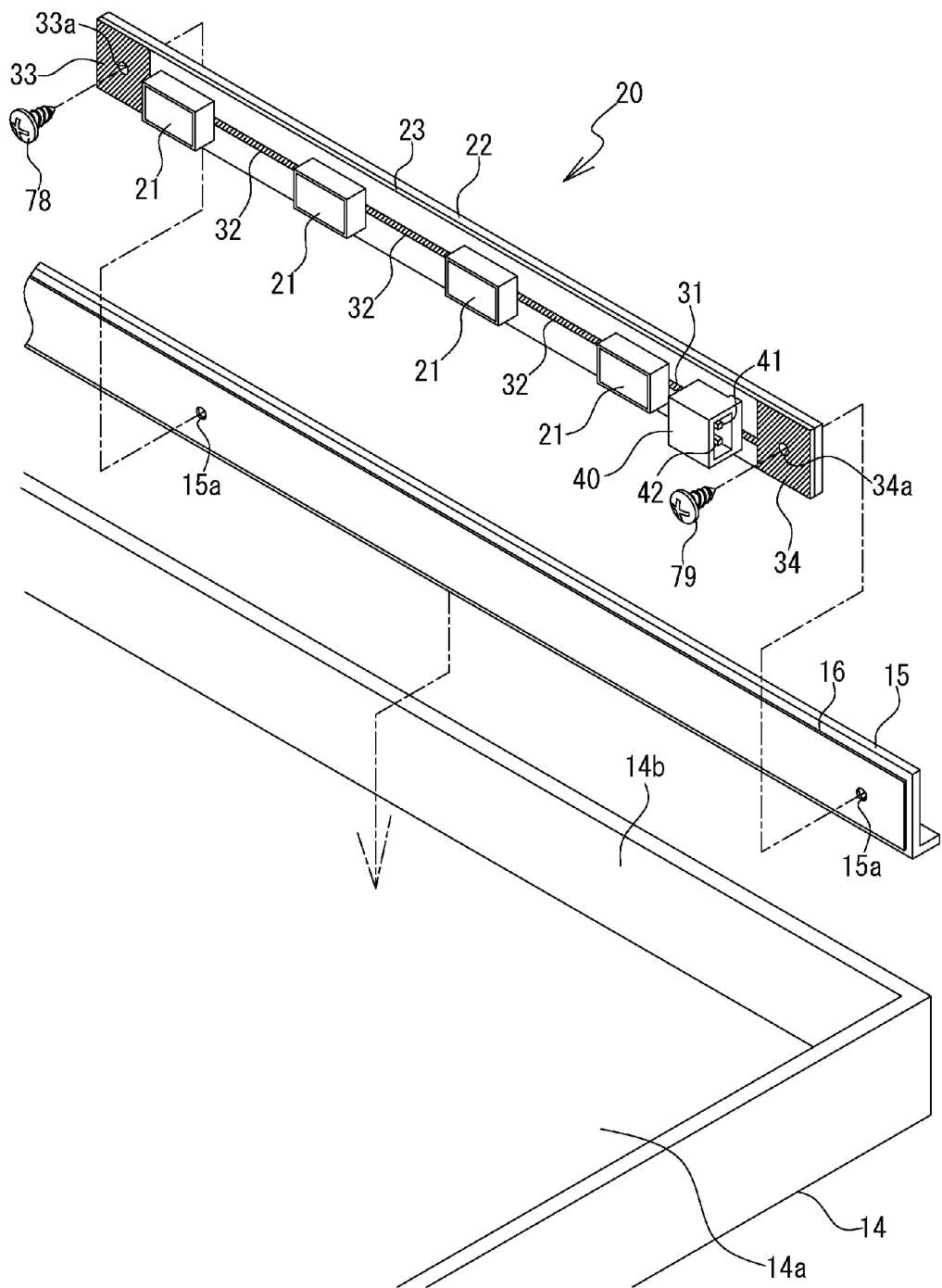
FIG. 7 is an external perspective view showing the LED substrate and a fixing plate to which the LED substrate is to be fixed.
Figure 8:
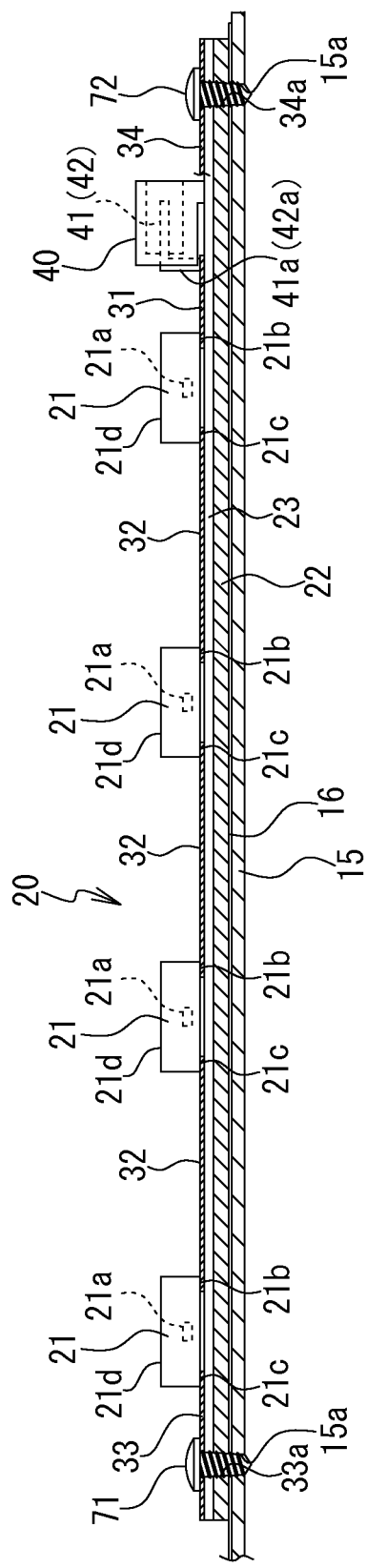
FIG. 8 is a cross-sectional view showing the LED substrate and the fixing plate shown in FIG. 7.
Figure 10:
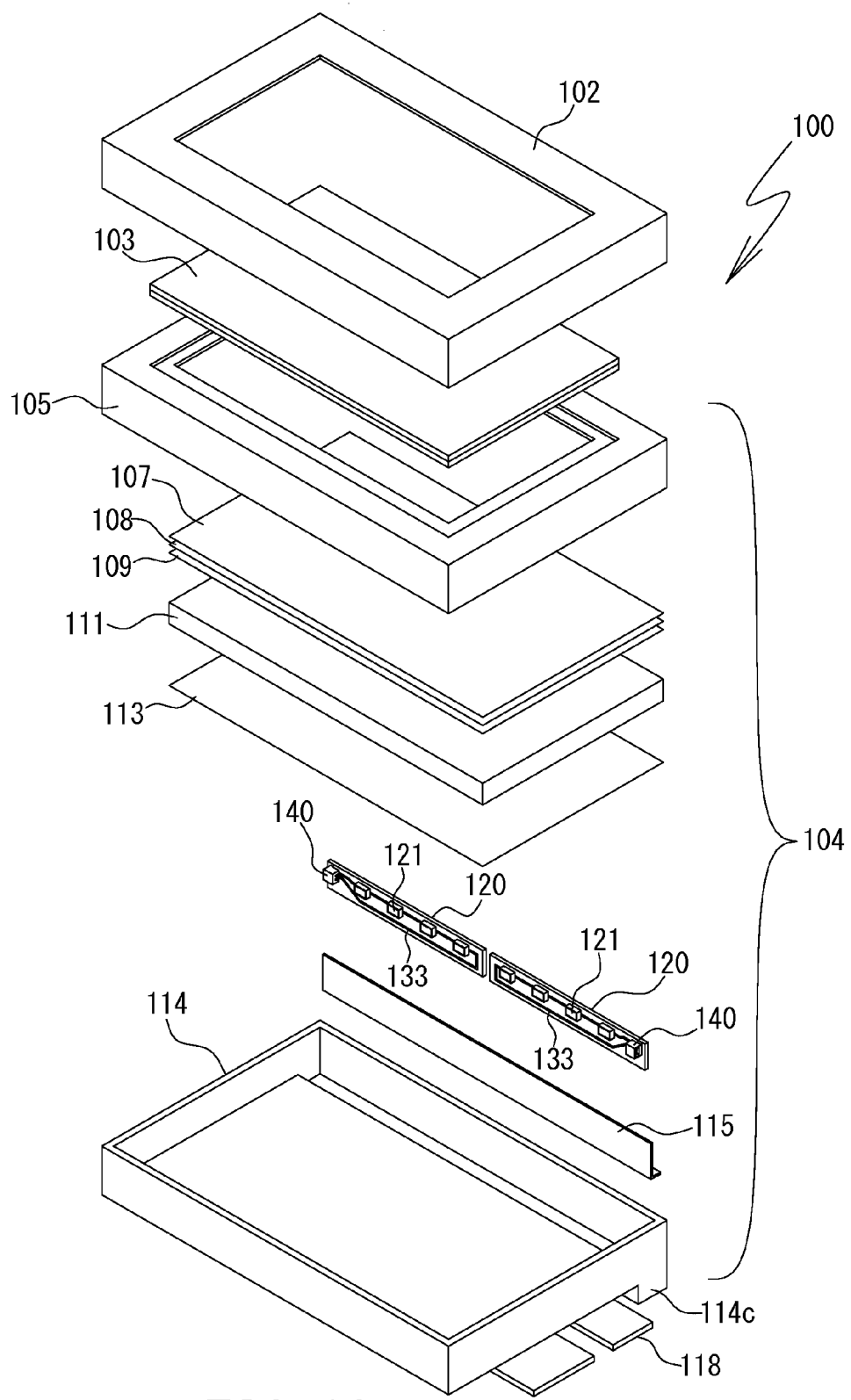
FIG. 10 is an exploded perspective view showing a schematic configuration of a conventional liquid crystal display device.

It is also preferable that first and second sheet-metal screws 78 and 79 are used instead of the first and second sheet-metal screws 71 and 72, the first and second sheet-metal screws 78 and 79 being longer than the first and second sheet-metal screws 71 and 72, and front ends of the first and second sheet-metal screws 78 and 79 are inserted into through-holes 15a provided to the fixing plate 15 and the thermal conductive sheet 16 as shown in FIGS. 7 and 8. This configuration allows not only electrical connection between the first ground pattern 33 and the radiating plate 22 and electrical connection between the second ground pattern 34 and the radiating plate 22, but also attachment of the LED substrates 20 to the fixing plate 15.

The backlight chassis 14 usually functions as a grounding member arranged to electrically ground the power board 18 arranged to supply power to the LED substrates 20 and the control board 19 arranged to drive the liquid crystal display panel 3. Thus, in the configuration shown in FIGS. 7 and 8, the first ground pattern 33 and the second ground pattern 34 of each LED substrate 20 are electrically connected to the backlight chassis 14 that functions as the grounding member via the sheet-metal screws 78 and 79, the radiating plate 22 and the fixing plate 15. Thus, electrical grounding properties of the first ground pattern 33 and the second ground pattern 34 of each LED substrate 20 are improved, which allows stable power supply to the LEDs 21.

If a thermal conductive sheet that possesses electrical conductivity is used as the thermal conductive sheet 16 that is sandwiched between the radiating plate 22 of the LED substrate 20 and the fixing plate 15, electrical grounding properties of the first ground pattern 33 and the second ground pattern 34 of each LED substrate 20 are further improved.

Next, descriptions of first and second modified embodiments of the above-described embodiment will be provided with reference to FIGS. 9A and 9B. Explanations of the same components as those in the above-described embodiment are omitted, and different respects are explained mainly, providing the same reference numerals as those in the above-described embodiment to the same components.

FIG. 9A is a view showing the LED substrate 20 of the first modified embodiment, where conductive pastes 73 and 74 preferably made from solder are applied to inner surfaces of the first through-hole 33a of the first ground pattern 33 and the second through-hole 34a of the second ground pattern 34. Inserting the sheet-metal screws 71 and 72 into the through-holes 33a and 34a, to the inner surfaces of which the conductive pastes 73 and 74 are applied, can further improve electrical connection between the first ground pattern 33 and the radiating plate 22 and electrical connection between the second ground pattern 34 and the radiating plate 22.

It is preferable to provide raised portions 73a and 74a that are prepared by providing the conductive pastes 73 and 74 having a given thickness around inlets of the through-holes 33a and 34a into which the sheet-metal screws 71 and 72 are to be inserted. Providing the raised portions 73a and 74a can improve electrical connection between screw heads of the sheet-metal screws 71 and 72 and the first and second ground patterns 33 and 34 via the raised portions 73a and 74a, respectively.

FIG. 9B is a view showing the LED substrate 20 of the second modified embodiment, where the LED substrate 20 includes first and second conductive tapes 75 and 76 that are made preferably of conductive aluminum tapes having adhesive faces. In the present modified embodiment, one end of the first conductive tape 75 is attached to the front surface of the first ground pattern 33, and the other end is attached to the back surface of the radiating plate 22 disposed under the first ground pattern 33 as shown in FIG. 9B, whereby the first ground pattern 33 and the radiating plate 22 are electrically connected via the first conductive tape 75.

In addition, in a similar manner, one end of the second conductive tape 76 is attached to the front surface of the second ground pattern 34, and the other end is attached to the back surface of the radiating plate 22 disposed under the second ground pattern 34 as shown in FIG. 9B, whereby the second ground pattern 34 and the radiating plate 22 are electrically connected via the second conductive tape 76.

Thus, this configuration allows not only electrical connection between the first ground pattern 33 and the radiating plate 22 and electrical connection between the second ground pattern 34 and the radiating plate 22 via the sheet-metal screws 71 and 72, but also electrical connection between the first ground pattern 33 and the radiating plate 22 and electrical connection between the second ground pattern 34 and the radiating plate 22 via the conductive tapes 75 and 76, which can further improve electrical connection between the first ground pattern 33 and the radiating plate 22 and electrical connection between the second ground pattern 34 and the radiating plate 22.

Because each LED substrate 20 described above has the configuration that the first ground pattern 33 and the second ground pattern 34 are provided at the left and right ends of the LED substrate 20, and are electrically connected to each other via the metallic radiating plate 22, which is disposed thereunder while sandwiching therebetween the insulating layer 23, and via the sheet-metal screws 71 and 72, the configuration can be used as a ground wire for the LEDs 21.

Thus, downsizing (decreasing) in width of each LED substrate 20 by a width that is required in order to include the conventional ground pattern 133 disposed linearly along the longitudinal direction of the LED substrate 120 as shown in FIG. 12 can be achieved, and thus the height of the backlight chassis 14 (the height from the bottom plate 14a) can be reduced compared with a conventional backlight chassis as shown in FIG. 2, which can achieve a thin profile of the backlight unit 4, and a thin profile of the liquid crystal display device 1.

The foregoing description of the preferred embodiments of the LED substrate, the backlight unit and the liquid crystal display device of the present invention has been presented for purposes of illustration and description with reference to the drawings. However, it is not intended to limit the present invention to the embodiment, and modifications and variations are possible as long as they do not deviate from the principles of the present invention. For example, described above in the preferred embodiments is the configuration that the LED substrates 20 are disposed along one side of the light guide plate 11; however, the present invention is not limited to this configuration. Configurations such that the LED substrates 20 are disposed along two or four opposed sides of the light guide plate 11 are preferably used.

The invention claimed is:

1. An LED substrate that comprises:
    a long radiating plate made from metal;
    an insulating layer disposed on an upper surface of the radiating plate;
    a plurality of LEDs disposed on an upper surface of the insulating layer linearly along a longitudinal direction of the radiating plate, and connected to each other in series;
    a light source pattern disposed at one end on the upper surface of the insulating layer, and connected to the first LED from the one end;
    a first ground pattern disposed at the other end on the upper surface of the insulating layer, and connected to the first LED from the other end; and
    a connector disposed at the one end on the upper surface of the insulating layer, and comprising a light-source-side terminal and a ground-side terminal,
    wherein the LED substrate further comprises a second ground pattern disposed at the one end on the upper surface of the insulating layer,
    wherein the light source pattern is connected to the light-source-side terminal of the connector,
    wherein the second ground pattern is connected to the ground-side terminal of the connector,
    wherein the first ground pattern is connected to the radiating plate via a first screw made from metal that is inserted in a first through-hole provided to the first ground pattern and the radiating plate, and
    wherein the second ground pattern is connected to the radiating plate via a second screw made from metal that is inserted in a second through-hole provided to the second ground pattern and the radiating plate.

2. The LED substrate according to claim 1, wherein the metal from which the radiating plate is made comprises aluminum, and the first and second screws comprise sheet-metal screws.

3. The LED substrate according to claim 1, wherein conductive pastes are applied to inner surfaces of the first and second through-holes.

4. The LED substrate according to claim 1, further comprising:
   a first conductive tape, one end of which is attached to the first ground pattern, and the other end is attached to the radiating plate, wherein the first ground pattern and the radiating plate are connected via the first conductive tape; and
   a second conductive tape, one end of which is attached to the second ground pattern, and the other end is attached to the radiating plate, wherein the second ground pattern and the radiating plate are connected via the second conductive tape.

5. A backlight unit comprising:
   a light guide plate having a plate shape;
   an LED substrate disposed on a side surface of the light guide plate; and
   a chassis made from metal and arranged to house the light guide plate and the LED substrate,
   wherein the LED substrate comprises:
   a long radiating plate made from metal;
   an insulating layer disposed on an upper surface of the radiating plate;
   a plurality of LEDs disposed on an upper surface of the insulating layer linearly along a longitudinal direction of the radiating plate, and connected to each other in series;
   a light source pattern disposed at one end on the upper surface of the insulating layer, and connected to the first LED from the one end;
   a first ground pattern disposed at the other end on the upper surface of the insulating layer, and connected to the first LED from the other end; and
   a connector disposed at the one end on the upper surface of the insulating layer, and comprising a light-source-side terminal and a ground-side terminal,
   wherein the LED substrate further comprises a second ground pattern disposed at the one end on the upper surface of the insulating layer,
   wherein the light source pattern is connected to the light-source-side terminal of the connector,
   wherein the second ground pattern is connected to the ground-side terminal of the connector,
   wherein the first ground pattern is connected to the radiating plate via a first screw made from metal that is inserted in a first through-hole provided to the first ground pattern and the radiating plate, and
   wherein the second ground pattern is connected to the radiating plate via a second screw made from metal that is inserted in a second through-hole provided to the second ground pattern and the radiating plate.

6. The backlight unit according to claim 5, wherein the metal from which the radiating plate is made comprises aluminum, and the first and second screws comprise sheet-metal screws.

7. The backlight unit according to claim 6, further comprising a fixing plate made from metal that is disposed to stand on the chassis,
   wherein the LED substrate is fixed to the fixing plate by the first and second screws, and
   wherein the radiating plate is electrically connected to the chassis via the fixing plate.

8. The backlight unit according to claim 7, further comprising a thermal conductive sheet disposed between the fixing plate and the radiating plate of the LED substrate.

9. The backlight unit according to claim 8, wherein the thermal conductive sheet possesses electrical conductivity.

10. A liquid crystal display device comprising:
    a liquid crystal display panel; and
    the backlight unit according to claim 9 that is disposed behind the liquid crystal display panel.

11. The backlight unit according to claim 5, wherein conductive pastes are applied to inner surfaces of the first and second through-holes.

12. The backlight unit according to claim 5, further comprising:
    a first conductive tape, one end of which is attached to the first ground pattern, and the other end is attached to the radiating plate, wherein the first ground pattern and the radiating plate are connected via the first conductive tape; and
    a second conductive tape, one end of which is attached to the second ground pattern, and the other end is attached to the radiating plate, wherein the second ground pattern and the radiating plate are connected via the second conductive tape.

13. The backlight unit according to claim 5, further comprising a fixing plate made from metal that is disposed to stand on the chassis,
    wherein the LED substrate is fixed to the fixing plate by the first and second screws, and
    wherein the radiating plate is electrically connected to the chassis via the fixing plate.

14. The backlight unit according to claim 13, further comprising a thermal conductive sheet disposed between the fixing plate and the radiating plate of the LED substrate.

15. The backlight unit according to claim 14, wherein the thermal conductive sheet possesses electrical conductivity.

16. A liquid crystal display device comprising:
    a liquid crystal display panel; and
    the backlight unit according to claim 15 that is disposed behind the liquid crystal display panel.

* * * * *